United States Patent [19]
Connors et al.

[11] Patent Number: 5,211,998
[45] Date of Patent: May 18, 1993

[54] AUTOMOBILE HOOD ORNAMENT DECORATIVE DEVICE

[76] Inventors: Frank R. Connors; Caroline M. Connors, both of 8 Washington Dr., East Quogue, N.Y. 11942

[21] Appl. No.: 750,259

[22] Filed: Aug. 27, 1991

[51] Int. Cl.⁵ .............................................. B60R 13/04
[52] U.S. Cl. ...................................... 428/31; 40/591; 116/173; 280/727; 428/13
[58] Field of Search ................ 40/591; 248/27.3, 27.8, 248/539; 428/13, 31; 116/173; 280/727

[56] References Cited

U.S. PATENT DOCUMENTS

| | | | |
|---|---|---|---|
| 1,310,234 | 7/1919 | Denning | 248/539 X |
| 1,573,757 | 2/1926 | Acosta | 248/539 X |
| 1,744,196 | 1/1930 | Ames | 248/539 |
| 1,928,563 | 9/1933 | Hetzel | 248/539 |
| 2,294,986 | 9/1942 | Hynek | 248/539 |
| 2,643,841 | 6/1953 | Wallace | 248/539 |
| 2,789,782 | 4/1957 | Huth | 280/727 X |
| 3,136,289 | 6/1964 | Johnson | 40/591 X |
| 3,178,139 | 4/1965 | McFarlin | 248/539 |
| 3,260,486 | 7/1966 | Groff | 248/538 |
| 3,493,203 | 2/1970 | Gualano | 248/539 |
| 3,540,685 | 11/1970 | Gualano | 248/539 X |
| 4,560,597 | 12/1985 | Kanamori | 40/591 X |

*Primary Examiner*—Henry F. Epstein
*Attorney, Agent, or Firm*—Kelly & Hulme

[57] ABSTRACT

The present invention relates to mounting decorative devices, emblems and flags to automobiles and more particularly to the mounting of such items to the hood ornament of an automobile. The present invention is attached to the hood ornament by a first body means which fits over the hood ornament and which contains on its inside rubberized strips or gaskets or the like which cause it to fit snuggly onto the hood ornament. A second body means is of similar shape and a slightly larger size than the first body means and fits over the first body means and snaps onto the first body means. The second body means is transparent so that any designs, emblems, logos or the like placed between the two body means will be visable from outside the device. The two body means have rounded edges so that the risk of injury from impalement thereon is greatly reduced. The first and second body means may have holes therein with said holes being aligned between the first and second body means so that pins which are approximately U-shaped may have one leg of the pin inserted into the holes with the second leg thereof flush against the exterior of the second body means and so that flags attached to the exterior of the pin may hang freely therefrom without the necessity of having a flag staff which protrudes from the device and causes a greater risk of injury should anyone or anything come into contact with the device.

3 Claims, 1 Drawing Sheet

AUTOMOBILE HOOD ORNAMENT DECORATIVE DEVICE

BACKGROUND OF THE INVENTION

Devices for attaching decorative elements to the exterior of an automobile have been known for some time. U.S. Pat. No. 1,310,234, issued on Jul. 15, 1919 to T.F. Denning relates to the attachment of a windwheel and flag to the radiator cap of an automobile. The Denning patent utilizes a clamp to the radiator filling tube to which are attached windwheel and flags. Such a device is dangerous as it is rigidly fixed and objects may therefore be readily impaled upon it and such a device is also not readily adaptable for use in conjunction with a hood ornament instead of a radiator cap.

Another example of a previous automobile decorative device is U.S. Pat. No. 1,573,757, issued Feb. 16, 1926 to S.T. Elmo W Acosta, which is screwed onto the radiator in place of the radiator cap and rigidly afixes a flag thereto. This device also has the same problem as the Denning patent.

Also known are devices for holding flags which attach directly to the drip gutter or rain gutter of an automobile. Such devices also have the problems of being dangerous, as an object may be readily impaled upon such a device, and of not being able to be used in conjunction with the hood ornament of an automobile. The following patents are all examples of such a device: U.S. Pat. No. 1,928,563, issued Sep. 26, 1933 to R.G. Hetzel; U.S. Pat. No. 2,294,986, issued Sep. 8, 1942 to T.E. Hynek; U.S. Pat. No. 2,643,841, issued Jun. 30, 1953 to L. Wallace; U.S. Pat. No. 3,136,289, issued Jun. 9, 1964 to E.E. Johnson; U.S. Pat. No. 3,178,139, issued Apr. 13, 1965 to B. McFarlin; U.S. Pat. No. 3,260,486, issued Jul. 12, 1966 to E.L. Groff; U.S. Pat. No. 3,493,203, issued Feb. 3, 1970 to E.V. Gualano; and U.S. Pat. No. 3,540,685, issued Nov. 17, 1970 to E.V. Gualano.

The present device differs from those previously known in that the present device is attachable to the hood ornament of a car with said hood ornament being bendably mounted so that impalement is not likely to occur. The present device is also formed so as to avoid having any protruding flag stance or other edges which could readily cause injury. Further, the present device is also mounted in such a way that if the pressure is great enough the device will detach so that no injury is caused thereby.

SUMMARY OF THE INVENTION

The present invention relates to mounting decorative devices, emblems and flags to automobiles and more particularly to the mounting of such items to the hood ornament of an automobile. The present invention is attached to the hood ornament by a first body means which fits over the hood ornament and which contains on its inside rubberized strips or gaskets or the like which cause it to fit snuggly onto the hood ornament. A second body means which is of similar shape and a slightly larger size than the first body means and fits over the first body means and snaps onto the first body means. The second body means is transparent so that any designs, emblems, logos or the like placed between the two body means will be visable from outside the device. The two body means have rounded edges so that the risk of injury from impalement thereon is greatly reduced.

In another embodiment of the invention the first and second body means may have holes therein with said holes being aligned between the first and second body means so that pins which are approximately U-shaped may have one leg of the pin inserted into the holes with the second leg thereof flush against the exterior of the second body means and so that flags attached to the exterior of the pin may hang freely therefrom without the necessity of having a flag staff which protrudes from the device and causes a greater risk of injury should anyone or anything come into contact with the device.

Another object of the present invention is to provide an automobile hood ornament decorative device wherein the device is attached to the hood ornament in such a manner as to cause it to be securely attached thereto so that it will not be blown off by the wind but not so tight that upon collision with an object it will not be knocked off of the hood ornament.

Another object of the present invention is to provide an automobile hood ornament decorative device wherein the device will not prevent the bendable mounting of the hood ornament to be impeded and thereby increase the risk of impalement on the hood ornament and/or the device.

The foregoing and other objects of the present invention will appear more fully upon the following description and the accompaning drawings which illustrate a preferred embodiment of the invention. It is to be understood that changes may be made from the exact details shown and described without departing from the principles of the inventions.

DETAILED DESCRIPTION OF THE INVENTION

Figure 1:
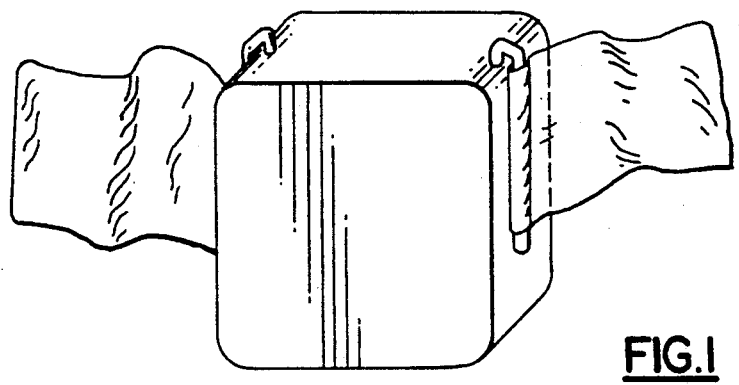
FIG. 1 is a perspective view of one embodiment of the present invention.
Figure 2:
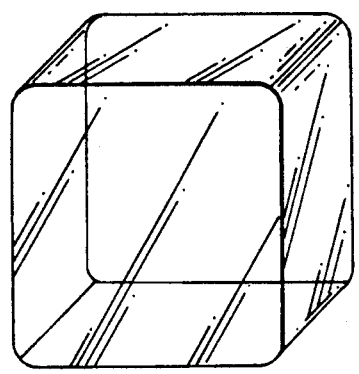
FIG. 2 is a perspective view of one of the body means of the present invention.
Figure 3:
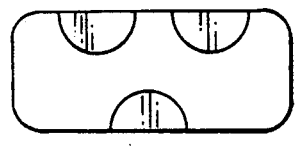
FIG. 3 is a bottom view of the first body means of the invention.
Figure 4:
FIG. 4 is a side view of a U-shaped pin of the present invention.

The present invention is relates to an automobile hood ornament decorative device. The device has a first body means which is roughly box like in shape which fits over an automobile hood ornament. The first body means is held snuggly onto the hood ornament by means of rubberized strips which are located on the inside of the first body means. Such rubberized strips are of a sufficient thickness so that they grip the hood ornament when the first body means is fitted thereon. It should be noted that other types of standard fittings or gaskets may be used to secure the first body means onto the hood ornament.

A second body means which is of similar shape and a slightly larger size then the first body means is designed to fit over the first body means. The second body means is transparent so that any designs, emblems, logos or the like placed between the first and second body means will be visable from the outside.

The device may also be provided with means for securely locking the first and second body means together. In one embodiment of this invention this may be accomplished by screwing the two devices together.

In another embodiment of the invention both the first and second body means may have outwardly protruding concavities (e.g. dimples) which cause the first and second body means to snap or lock together when the second body means is placed over the first body means.

In yet another embodiment of the invention the first and second body means may have rounded edges so that the risk of injury from impalement thereon is greatly reduced.

In still a further embodiment of the invention the first and second body means may be so formed so as to have openings therein which are aligned between the first and second body means. Pins or rods which are approximately U-shaped may be inserted into the openings so that one leg of the pin is on the inside of the first and second body means while the other leg of the pins are flush against the exterior of the second body means. Attached to the exterior leg of the pins may be flags or the like so that the flags may hang freely therefrom without the necessity of having a flag staff or the like which protrudes from the device and increases the risk of injury should anyone become impaled thereon.

In yet another embodiment of this invention the rubberized strips on the inside of the first body means of are of such a thickness that they grip the hood ornament with sufficient force to insure that the device will not be blown off by the wind or the automobile even while the automobile is in motion but not with so great a force that it can not readily be removed by hand and/or be knocked loose upon collision with an object.

In a still further embodiment of the present invention the depth of the cavity formed inside of the first body means is shallow enough so that the device will not fit so far over the hood ornament that it will interfere with the bendable mounting of the hood ornament. Such bendable mounting of the hood ornament is required in many states by law so as to reduce the risk of injury to persons and things colliding with the hood ornament.

What is claimed is the following:

1. An automobile hood ornament decorative device comprising:
    a first body means capable of fitting over an automobile hood ornament;
    a compression fitting means located inside the first body means and capable of causing the first body means to be securely attached to the automobile hood ornament; and
    a second body means which can fit over the first body means and be attached to the first body means and is transparent so that any ornamental designs placed between the first body means and the second body means will be visible from the outside.

2. The device of claim 1 wherein the first body means and the second body means are capable of locking together.

3. The device of claim 1 wherein the first body means and the second body means further define openings capable of receiving U-shaped pins so that an exterior leg of each pin is flush with the exterior of the second body means and that flags attached to the exterior legs may hang freely therefrom.

* * * * *